United States Patent
Barteaux et al.

(10) Patent No.: US 10,859,256 B2
(45) Date of Patent: Dec. 8, 2020

(54) METHOD AND SYSTEM UTILIZING WASTE HEAT FOR EVAPORATION

(71) Applicant: Real Power Solutions, LLC, Boise, ID (US)

(72) Inventors: Mark Owen Barteaux, Eagle, ID (US); Peter James Wachtell, Boise, ID (US)

(73) Assignee: REAL POWER SOLUTIONS, LLC, Boise, ID (US)

(*) Notice: Subject to any disclaimer, the term of this patent is extended or adjusted under 35 U.S.C. 154(b) by 323 days.

(21) Appl. No.: 15/950,054

(22) Filed: Apr. 10, 2018

(65) Prior Publication Data

US 2018/0292084 A1  Oct. 11, 2018

Related U.S. Application Data

(60) Provisional application No. 62/484,329, filed on Apr. 11, 2017.

(51) Int. Cl.
| | | |
|---|---|---|
| *F22B 3/00* | (2006.01) | |
| *F23G 7/06* | (2006.01) | |
| *F22B 1/18* | (2006.01) | |

(52) U.S. Cl.
CPC .............. *F22B 3/00* (2013.01); *F22B 1/1807* (2013.01); *F22B 1/1815* (2013.01); *F23G 7/06* (2013.01); *F23G 2900/50208* (2013.01); *Y02E 20/12* (2013.01)

(58) Field of Classification Search
CPC ....................................................... F22B 3/00
See application file for complete search history.

(56) References Cited

U.S. PATENT DOCUMENTS

| | | | | |
|---|---|---|---|---|
| 5,934,207 A | * | 8/1999 | Echols | B01D 1/0058 110/345 |
| 6,029,370 A | * | 2/2000 | Cromeens | F26B 23/02 34/443 |
| 7,959,376 B1 | * | 6/2011 | Duesel, Jr. | B01D 53/62 405/129.95 |
| 2004/0045682 A1 | * | 3/2004 | Liprie | C02F 1/16 159/31 |
| 2006/0236698 A1 | * | 10/2006 | Langson | F01K 25/08 60/651 |
| 2016/0258266 A1 | * | 9/2016 | Frick | B01D 3/007 |

* cited by examiner

*Primary Examiner* — Nathaniel Herzfeld (74) *Attorney, Agent, or Firm* — MH2 Technology Law Group LLP (57) ABSTRACT

A method of evaporation comprises cooling a prime mover using a coolant. The cooling comprising pumping the coolant from the prime mover through a heat exchanger and back to the prime mover in a cooling circuit. A process fluid is circulated in an evaporator loop comprising the heat exchanger and a flash tank, the process fluid being circulated from the flash tank, through the heat exchanger and to a flash nozzle positioned in the flash tank. A pressure of the process fluid is reduced across the flash nozzle from a first pressure upstream of the flash nozzle to a second pressure in the flash tank, wherein heat from the coolant provides sufficient thermal energy to the process fluid in the heat exchanger so that a percentage of the process fluid changes phase from liquid to steam when the pressure of the process fluid is reduced across the flash nozzle. Steam is ejected from the flash tank to separate the steam from the process fluid.

17 Claims, 6 Drawing Sheets

METHOD AND SYSTEM UTILIZING WASTE HEAT FOR EVAPORATION

RELATED APPLICATIONS

The present disclosure claims priority benefit of U.S. Provisional Application 62/484,329, filed on Apr. 11, 2017, the disclosure of which is incorporated herein by reference in its entirety.

DETAILED DESCRIPTION

Field of the Disclosure

The present disclosure is directed to systems and methods of utilizing waste heat for evaporation.

Background

Landfills are highly regulated and are required to capture and burn methane that is generated by waste decomposition in the landfill. In addition, landfills are required to control the flow of water from the landfill to any adjacent property and to treat certain portions of it as leachate, which has specific disposal requirements. For some landfills, the amount of water that must be managed often exceeds the landfill's ability to handle it on the landfill site. This can occur when there are large amounts of water due to rainfall, when the landfill cannot absorb and hold the water due to the local climate and soils, or for landfills that are short on available space and cannot create containment ponds and evaporation ponds to safely reduce the volume of the leachate and other effluent.

Many landfills now operate Landfill Gas to Energy (LFGTE) plants on the landfill itself to make beneficial use of the landfill gas (approximately 50% methane, a greenhouse gas), which is required by law to be captured and destroyed. In this manner, the methane produced as a byproduct of waste decomposition in the landfill can be destroyed in a process that produces electricity, which can then be used as a source of power at the landfill, or be transported on the electrical grid for use by customers at locations away from the landfill. LFGTE plants may employ reciprocating internal combustion engines or turbines as prime movers for turning alternators, or in certain cases, fuel cells, that convert the methane in the landfill gas stream to useable electrical energy that can be transported by the electrical grid.

Each of these methods of power generation has some loss of efficiency in converting the methane gas into useable energy. Much of this loss is due to process, mechanical, and/or chemical inefficiencies. One result is that heat is generated, which must be rejected from the prime mover or the chemical process (e.g., such as the chemical processes that occur in fuel cells) to maintain proper operating temperatures for the equipment.

In the example of a LFGTE reciprocating internal combustion engine (RICE), approximately one-third of the energy carried in the fuel gas is rejected in the form of exhaust heat from the engine exhaust. Another one-third of the input energy is rejected from the engine cooling system as low grade waste heat. The remaining one-third of landfill gas energy input is successfully converted into electricity, which can be used at the landfill or sold to customers via the electrical grid that is operated by the electric utility or a private distributor.

The low grade waste heat rejected from the RICE cooling system is removed, for example, by circulating coolant, typically a mixture of water and ethylene glycol, through the engine to collect the heat, and then sending the coolant through a water-to-air heat exchanger (e.g. a traditional radiator) to ensure that enough heat is rejected to maintain proper operating temperatures.

It is generally well known to capture and utilize high grade heat from sources such as engine exhaust for further industrial processing. Using high grade waste heat usually impacts prime mover performance negatively because the heat exchange process with the high grade engine exhaust energy produces additional back pressure on the prime mover, decreasing its efficiency. Low grade heat is typically not utilized for industrial processing due to its relatively low temperatures and is simply released into the atmosphere.

The cost to purchase and install a radiator is a significant portion of the power plant construction budget. Radiator capacity diminishes over time as it loses its ability to reject heat. This is caused in part by heat transfer surface fouling and tubing fouling, which also increases head loss, thereby reducing coolant flow rates. One result is that the cooling system radiator requires significant maintenance and may need to be periodically replaced. Radiators require large air handling fans to move the required amount of air through them to reject the heat energy from the prime mover. These air handling systems consume significant amounts of electrical energy, which represents a large portion of the parasitic load on the power plant, and which reduces the net power generated and exported to the grid by the facility.

Novel systems and methods for increasing efficiency of power plants, such as LFTGE plants, and/or that allow for more efficient disposal of leachate from landfills, would be a step forward in the art. Novel systems and methods for generally increasing efficiency of evaporation processes would also be a welcome addition in the art.

SUMMARY

An embodiment of the present disclosure is directed to a method of evaporation. The method comprises cooling a prime mover using a coolant, the cooling comprising pumping the coolant from the prime mover through a heat exchanger and back to the prime mover in a cooling circuit. A process fluid is circulated in an evaporator loop comprising the heat exchanger and a flash tank, the process fluid being circulated from the flash tank, through the heat exchanger and to a flash nozzle positioned in the flash tank. A pressure of the process fluid is reduced across the flash nozzle from a first pressure upstream of the flash nozzle to a second pressure in the flash tank, wherein heat from the coolant provides sufficient thermal energy to the process fluid in the heat exchanger so that a percentage of the process fluid changes phase from liquid to steam when the pressure of the process fluid is reduced across the flash nozzle. Steam is ejected from the flash tank to separate the steam from the process fluid.

The present disclosure is also directed to an evaporation system. The system comprises a prime mover. The system further comprises a cooling circuit comprising a pump for circulating coolant through the prime mover and a heat exchanger in fluid connection with the pump. A process fluid evaporator loop comprises a flash tank in fluid connection with the heat exchanger, the flash tank comprising a flash tank exhaust stack for exhausting steam and a flash nozzle positioned in the flash tank.

The present disclosure is also directed to a method of evaporation. The method comprises employing a liquid coolant for cooling a heat source, the cooling comprising circulating the coolant through a first flow path of a liquid-to-liquid heat exchanger and back to the heat source in a cooling loop. A process fluid is circulated in an evaporator loop comprising the liquid-to-liquid heat exchanger and a flash tank, the process fluid being circulated from the flash tank, through a second flow path of the heat exchanger and through a flash nozzle positioned in the flash tank. A pressure of the process fluid is reduced across the flash nozzle from a first pressure upstream of the flash nozzle to a second pressure in the flash tank, wherein heat from the coolant provides sufficient thermal energy to the process fluid in the heat exchanger so that a percentage of the process fluid changes phase from liquid to vapor when the pressure of the process fluid is reduced across the flash nozzle. The vapor is ejected from the flash tank to separate the vapor from the process fluid.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

FIG. 7 illustrates an exploded view of the flash tank of FIG. 4, according to an embodiment of the present disclosure It should be noted that some details of the figure have been simplified and are drawn to facilitate understanding of the embodiments rather than to maintain strict structural accuracy, detail, and scale.

DESCRIPTION OF THE EMBODIMENTS

An embodiment of the present disclosure is directed to system that effectively utilizes waste heat from a prime mover (e.g., an engine or turbine of a power plant) to power a process of efficient evaporation of leachate at a landfill. In an embodiment, it may be possible for the system to utilize sufficient amounts of heat rejected from the prime mover so that the prime mover can be operated without employing a traditional radiator. Where aftercoolers are used to densify charge air for the prime mover, the systems of the present disclosure may also improve air densification and therefore, performance of the prime mover. This allows for higher power density in the prime mover and better performance in high ambient conditions where traditional radiators fail. Since the LFGTE plant may not have to operate radiator fans while the system of the present disclosure is in operation, the parasitic load on the power plant can potentially drop by a very significant margin, leaving the LFGTE operator with more net power to sell.

In an embodiment, two waste products (waste heat that is be carried away from the prime mover, and leachate, which is being managed or disposed of by the landfill operator) are used to beneficially eliminate both as a problem. The result is that a large amount of leachate can reliably be disposed of while remaining in compliance with the landfill operator's regulatory requirements. This can be done on an ongoing basis and can reduce or eliminate the need for the landfill to pay to have the leachate transported from the landfill site for safe disposal or evaporation in another location. In addition, the process potentially has the effect of providing for a large amount of additional heat rejection capacity for the prime mover. This heat rejection capacity is available when the evaporator is in operation, and can serve to eliminate the need to replace the existing radiator serving the prime mover as the heat transfer capacity of the radiator is reduced over time.

In an embodiment, the process starts by exchanging heat between a prime mover's cooling circuits and leachate collected by a landfill. This reduces the flow of heat to be rejected by a traditionally employed radiator while still allowing the prime movers operating temperature to be maintained within an acceptable range. As part of the process, the leachate is pressurized to a level that will support heating of the leachate by the prime mover's cooling circuits to a temperature above the atmospheric related boiling point (e.g., above the boiling point temperature at 1 atmosphere) per the temperature-pressure relationship laws. The pressurized, heated leachate, which may be referred to herein as "superheated" leachate, is flowed to a flash tank containing additional leachate, where the pressure is dropped so as to "flash" water in the superheated leachate to vapor. Excess heat energy from the superheated leachate is transferred into the additional leachate in the flash tank via the flash steam process. The leachate in the flash tank is heated to the saturated temperature by continuous operation of this loop. After this point in the process is reached, further heating by the heat exchanger to form superheated leachate in the loop causes a portion of the leachate at the point of pressure drop in the loop, and potentially a portion of the leachate in the vessel, to convert to steam. This process is continued to convert the water in the leachate to steam on a continuous basis during operation at the stated conditions. This continuous loop process of heating the pressurized leachate and releasing the heat to produce steam, which is referred to herein as an evaporation loop, also affords the opportunity to constantly filter the leachate to remove impurities and sediment and so forth. This design allows for removal of the particulate, and thereby aids in control of foaming associated with boiling leachate to produce steam.

To ensure efficiency in the system and to increase capacity, our design harnesses heat energy available in the exhaust system of the prime mover as well. Ambient air is heated in a gas-to-gas heat exchange process with the hot prime mover exhaust and then drawn through the flash steam vessel where the steam is being produced. The energy added by the hot air increases capacity and also increases the likelihood that steam being produced is superheated, so that high steam quality (e.g., approximately 100% steam quality) is achieved all the way out to the discharge point. This helps reduce or prevent liquid component in the ejected steam. At the same time, the particular equipment arrangement and flow path of the heated air results in the flash steam vessel being at relatively low pressure (e.g., at or below 1 atmosphere), which also increases steam production capacity in accordance with the laws of thermodynamics governing the saturated temperature/pressure relationship.

In an embodiment, a particulate filter is employed to capture solids and precipitates from the leachate and from the leachate boiling process. The particulates filtered from the leachate are collected and directed to a holding tank or dehydration area to be processed for suitable disposal either in the landfill or offsite, as appropriate. Likewise, as the portion of leachate in the heating loop becomes an increasingly concentrated brine, the loop is diluted by introducing additional fresh leachate and/or porting off the brine to be disposed of in the same manner as the solids and precipitates.

The already low cost to operate this system may be further offset by the reduction of, or elimination of the operation of the fans in the radiator system. Using a scaled down prototype system, it has been estimated that by employing heat rejected by the prime mover to boil the leachate, a single, large RICE at a LFGTE facility can potentially remove over 6000 gallons of leachate per day per RICE and can reduce or eliminate the need to operate its radiator fan motors. In a scaled up system, the radiator motors can use approximately 30 kw of electricity per hour of operation. By saving this energy, it is believed that the system can potentially pay for its own operation and allow for more net energy to be exported and sold by the operator. In addition, the removal of the water from the leachate can eliminate the need for the landfill to transport and dispose of leachate, (for example, up to an estimated 6000 gallons per day of leachate per RICE being operated based on the results of the scaled down prototype). The actual amounts of leachate processed can vary depending on many factors, including the leachate content, the size and type of engines used for the prime movers, and other factors. However, any reduction in leachate can potentially lower the carbon footprint of the entire disposal process in that the vehicles hauling the leachate are kept off the road. All the known benefits of lowering the traffic on the road are thereby gained as well. This can include risk and exposure, wear and tear on public infrastructure, imports of tires and other consumables and so on.

The systems of the present disclosure can increase the efficiency of the a LFGTE power plant while simultaneously providing an additional benefit in ridding the landfill of another waste product; the landfill leachate or other water-based effluents. This is possible because energy typically rejected by the prime mover or chemical process (e.g., such as the chemical processes in a fuel cell) is used as an additional input.

Additional details of the system and process will now be provided. Coolant circulating through a prime mover and/or its associated peripheral devices such as aftercoolers, gear boxes and alternators, is typically sent straight out to a water-to-air heat exchanger, such as a conventional radiator, to provide heat rejection capability for the devices. The coolant circuit or circuits in a prime mover and its associated peripheral devices may be configured in one or more coolant loops servicing all heat rejecting components in one loop, or more often, two or more loops servicing various combinations of the heat rejecting components associated with the prime mover and alternator. In the methods and systems of the present disclosure, the energy contained in this coolant is diverted before entering the traditional radiator to first flow through one or more liquid-to-liquid heat exchangers (HX's) to transfer the energy in the coolant into the process fluid, thereby boiling and converting the process fluid to vapor (e.g., steam where the process fluid is a leachate or other water-based process fluid). The term "water-based process fluid" is a fluid for which water is the liquid component having the greatest concentration. In an example, the process fluid can be greater than 50% by weight water, such about 50% to about 100% by weight water.

In an embodiment, the process fluid is filtered as it enters the evaporator, filling the piping, pumps, flash tank and other related components. Once the evaporator is filled, a process fluid circulation pump or pumps is/are powered on and begin/s circulating the process fluid through the coolant/process fluid HX's. This begins the heat exchange process that extracts heat from the coolant, transfers it to the process fluid, and ultimately causes boiling of the process fluid in the flash tank. The one or more pumps ensure the process fluid pressure remains comfortably above the flash point for the process liquid until it is de-pressurized and the energy is released in the flash process, producing vapor (e.g., steam).

In an embodiment, an additional filtration process takes place in the process fluid evaporator loop. This filtration process removes solids and precipitates contained in the process fluid as well as those that are produced in the boiling of the process fluid. The filtration of the process fluid provides mechanical protection of the devices in the system and allows for collection of potentially unwanted reject material from the process. In addition, the filtration of the process fluid can help minimize the residuals in the process fluid that contribute to foaming of the process fluid in the flash tank.

As the process begins to convert the process fluid to vapor (e.g., steam), additional process fluid is introduced to make up and hold the system level constant. In an embodiment, the makeup process fluid is pre-heated in a heat exchange process with one or more of the cooling loops in the prime mover and generator. In an alternatively embodiment, the makeup fluid is not preheated.

In an embodiment where water-based process fluid is employed, the steam produced in the process may be of low quality, containing a certain amount of moisture per the saturation temperature and pressure relationship. To heat the steam sufficiently to provide relatively higher quality steam, hot air can optionally be introduced into the flash tank at the upper level of the vessel. This added energy provides sufficiently high steam quality so that little or no liquid forms as the process fluid is released from the flash tank exhaust stack.

In an embodiment, an air handler or blower is used to move ambient air over a prime mover exhaust conduit and through an ambient air HX in order to heat the ambient air. The heated ambient air then flows to the flash tank and out the flash tank exhaust stack. The air handler or blower is positioned so as to pull the heated ambient air through the system versus pushing the ambient air. This has the effect of lowering the pressure in the flash tank to some level below atmospheric pressure at the locale, which in turn increases efficiency of the process by lowering the flash point temperature of the process liquid in accordance with the saturated temperature and pressure relationship.

Optionally, in the final stage of the overall process, the exhausted hot air and steam is used in a drying bed to provide radiant or convective heat to a bed that dries the rejected portion of the process fluid and solids accumulated and removed from the filtration and purging processes employed in the systems of the present disclosure. This could be accomplished by, for example, piping the hot air and steam though the drying bed in any suitable manner. One of ordinary skill in the art would be able to apply the hot air and steam to a drying bed to accomplish the desired drying of the rejected process fluids and accumulated solids. Additionally, the energy exchange used in the drying bed could cause the steam to condense back to water form where it could optionally be collected and stored as "clean" water, even if not potable.

Figure 1:
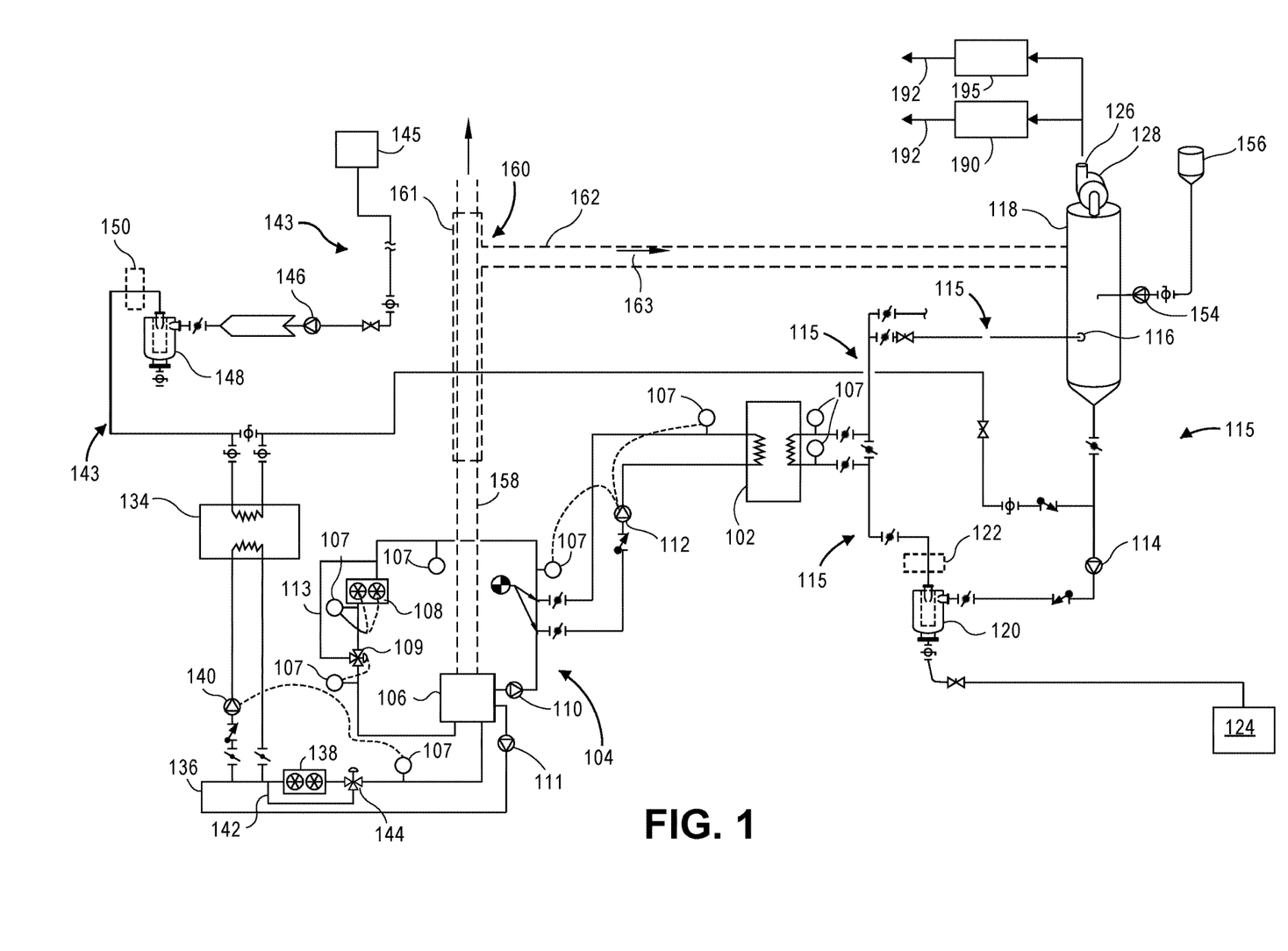
FIG. 1 shows an evaporator system, according to an embodiment of the present disclosure.

FIG. 1 illustrates an example system, according to an embodiment of the present disclosure. In an embodiment, a heat exchanger (HX) 102, such as a plate and frame HX, is installed in a cooling circuit 104 (e.g., a jacket water cooling circuit) of a reciprocating internal combustion engine 106 (RICE) that is utilized as a prime mover for a LFGTE plant. The HX 102, is placed in series with the traditional radiator 108, and may be used in place of, or in addition to, the radiator 108 to provide cooling of the RICE 106. Temperature sensors 107 can be positioned in various positioned to determine temperatures of the circulating coolant and other process fluids employed in the system of FIG. 1. A bypass 113 is included for diverting coolant around the traditional radiator 108. A thermostatically or process controlled three-way valve 109 is used at the outlet of the existing radiator 108 to ensure that engine coolant (e.g., jacket water, such as a mix of ethylene glycol and water) being returned to the RICE 106 from the radiator 108 and HX 102 is of a temperature that will provide suitable cooling of the RICE 106.

The heated coolant being pumped from the prime mover (e.g., RICE 106) to the heat exchanger has a temperature ranging, for example, from about 200° F. to about 300° F., such as about 212° F. to about 280° F., or about 220° F. to about 260° F. Temperatures outside of this range can also be employed, (e.g., temperatures of 400° F. or less, such as 350° F. or less) as long as they are suitable for evaporating the process fluid. Thus, the coolant coming from the prime mover has a relatively low grade heat compared to higher temperature heat sources, such as engine exhaust. The heated engine coolant is circulated through one side of HX 102 by the RICE's traditionally employed, engine driven pump 110. Engine pump 110 can optionally be augmented by an additional pump 112, which may be a variable speed pump or any other suitable pump.

If after the engine coolant is circulated through HX 102 in the coolant circuit, the coolant temperature is determined to have a sufficiently low temperature to provide suitable cooling of the RICE 106, then the coolant may be flowed through bypass 113, so that radiator 108 is not employed for cooling. Alternatively, if the coolant temperature is not sufficiently reduced by the HX 102, then three-way valve 109 can be used to divert water through the radiator 108 to provide additional cooling.

A process fluid, which may be, for example, landfill leachate (leachate), is pumped through the process side of HX 102 by a leachate circulation pump 114. Leachate circulation pump 114 provides leachate circulation and pressure in evaporator loop 115 that is adequate to provide a margin of safety for avoiding boiling and steam formation in the evaporator loop 115 until the leachate reaches a nozzle 116, as will now be described.

Figure 5:
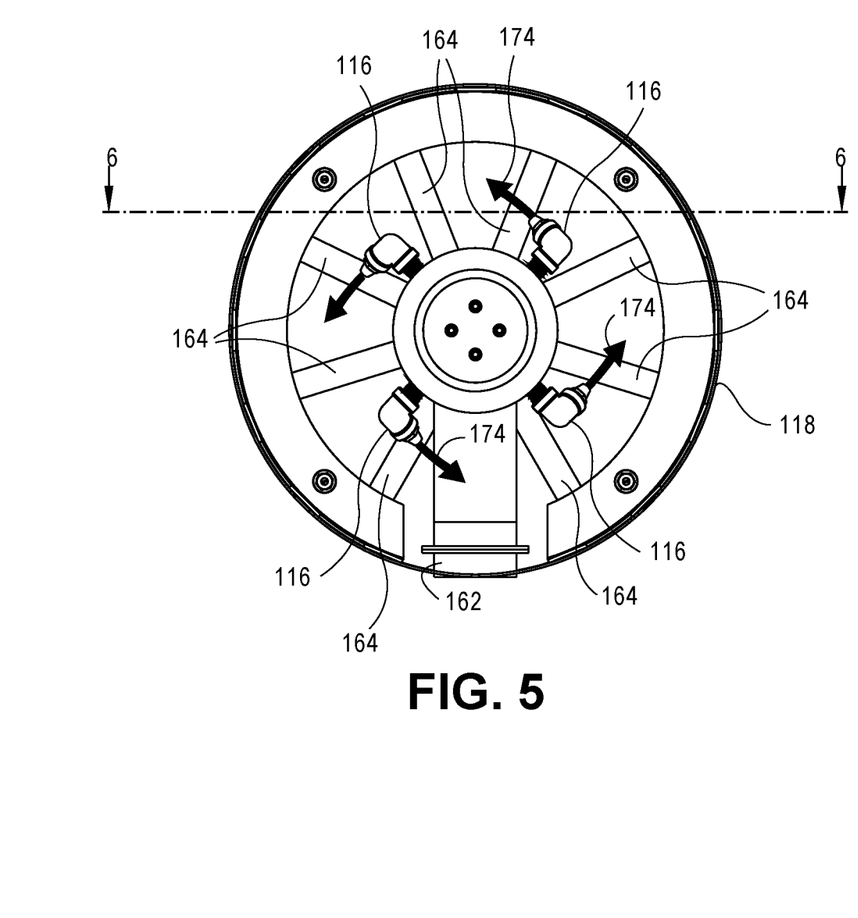
FIG. 5 illustrates a top view of the flash tank of FIG. 4, according to an embodiment of the present disclosure.

Leachate circulation pump 114 delivers heated, pressurized leachate to a pressure reducing, flash orifice/s or valve/s (hereinafter referred to as "nozzle 116"). Multiple nozzles 116, such as two, three, four or more can be employed. FIG. 5 illustrates a top view of an embodiment of a flash tank 118 with 4 nozzles 116. The at least one nozzle 116 is installed in a flash tank 118 and can comprise one or more orifices sized to maintain a sufficiently high pressure in the evaporator loop 115 before the nozzle so that the leachate does not vaporize (e.g., pressure is above the boiling point pressure). In an embodiment, the at least one nozzle 116 is positioned so that, during operation, the nozzle 116 is submerged slightly below the surface of the leachate in flash tank 118. In an alternative embodiment, the at least one nozzle 116 is disposed slightly above the surface of the leachate in the flash tank 118. Some energy in the leachate is released across the nozzle 116 as the pressure drops across the nozzle from a higher pressure before the nozzle to, for example, atmospheric pressure or just below atmospheric pressure after the nozzle, and steam is produced in the flash tank 118. For example, the pressure before the nozzle 116 in the evaporator loop 115 can range from about 10 PSI to about 100 PSI, or about 15 PSI to about 50 PSI, while the pressure after the nozzle in the flash tank 118 can range, for example, from less than 20 PSI to about 5 PSI, or about atmospheric pressure (e.g., 14.7 PSI), or less than atmospheric pressure, to about 10 PSI. The actual pressures used can be outside of these ranges and will depend on, among other things, the boiling point of the process fluid being evaporated and the temperatures being used for the evaporation process. The balance of energy contained in the leachate may be released in the flash tank 118, which is filled to the desired operating level with additional leachate. This energy release may convert a certain percentage of the leachate in the flash tank into steam.

The leachate continuously circulates through the flash tank 118, to pump 114, thence to a centrifugal solids separator 120, an optional filter bank 122, HX 102, and back to the flash nozzle 116 and flash tank 118 in a closed loop. This is a continuous process during normal operation. The flash tank 118 is positioned above the pump 114, as illustrated in FIG. 1. This allows the liquid in flash tank 118 to provide a certain amount of pressure, or head, to the pump 114. Because the process fluid going through the pump 114 may be at or near the boiling temperature, there can be a risk that a portion of the process fluid, which is in liquid phase, may change to a vapor phase in the pump, which could potentially cause cavitation in the pump 114. The risk of cavitation is reduced by the increased head from the column of liquid above the pump 114 in flash tank 118. The introduction of the makeup leachate before pump 114 can also reduce the risk of cavitation. This is because the makeup leachate is at a relatively cool temperature and will act to reduce the temperature of the leachate in the evaporator loop 115 before it goes through the pump, which in turn reduces the risk of vaporizing the leachate. Introduction of the leachate at this point in the process may also potentially increase efficiency of the heat transfer process in HX 102.

In an embodiment, solids and process precipitates are back-flushed from the centrifugal solids separator 120 and filter bank 122 (hereinafter, "filtration system"), on an interval determined by measurement of the solids accumulated in the filtration system or on a timed basis. In other embodiments, the filtration system can employ any other type of suitable filtering mechanism, such as a filter without a centrifugal solids separator. The waste material rejected in the back-flush process, comprising both the solids and liquids backwashed from the filtration system, can be received in a holding tank 124 for proper disposal later, or piped or otherwise transported to a drying bed or other disposal facility. The waste material has a reduced weight and/or volume compared to a weight and volume of the total amount of process fluid (e.g., leachate) used to produce the waste material, therefore allowing for easier and less costly disposal of the landfill waste. For example, the waste product collected in holding tank 124 from each unprocessed gallon of process fluid (e.g., leachate) received by the input system from the landfill may be less than 50% of the weight and/or volume of the unprocessed gallon, such as less than 25%, or less than 20%, or less than 15%, or less than 10%, or less than 5% of the weight and/or volume of the unprocessed gallon. Proper disposal of the waste material may include trucking off site to a qualified disposal entity, return of the waste product to the landfill, or further dewatering and dehydration in an associated drying bed, as described further herein. The particulate removed and collected may include material subject to concerns of regulatory agencies. In an embodiment, the systems and processes of the present disclosure may sufficiently concentrate the solid waste component so that it can be controlled and disposed of in accordance with regulations governing solid waste disposal laws, which may be preferable to the regulations governing liquid waste that must be followed for disposing of unprocessed leachate.

When the evaporator loop reaches a balanced state, there will be a certain volume of leachate converted to steam, which is ejected through a flash tank exhaust stack 126 on the flash tank 118 via the exhaust blower 128. In an embodiment, a corresponding flow of makeup leachate is introduced to the evaporator loop to make up what is being converted to steam so the flash tank level remains approximately constant. In an embodiment, makeup leachate is preheated in a HX 134, such as a plate and frame heat exchanger or any other suitable type of HX, which is installed in the aftercooler cooling circuit 136 of the LFGTE generator engine (referred to in this example as RICE 106). HX 134 is placed in series with the traditionally employed aftercooler radiator 138, just as the HX 102 is placed in series with radiator 108 in that circuit. An engine driven aftercooler pump 111 may be employed to provide circulation of the aftercooler circuit coolant through HX 134. A pump 140, such as a variable speed pump, or any other suitable pump, can optionally be employed to augment circulation provided by the aftercooler pump 111, as desired. If after the aftercooler coolant is circulated through HX 134, the coolant temperature is determined to have a sufficiently low temperature to provide suitable cooling of the aftercooler (not shown) of the RICE 106, then the aftercooler coolant may be flowed through bypass 142, so that radiator 138 is not employed for cooling. Alternatively, if the coolant temperature is not sufficiently reduced by the HX 134, or if additional cooling is desired to increase the aftercooler efficiency, then three-way valve 144 can be used to divert water through the radiator 138 to provide additional cooling. In an embodiment, the radiator 138 may be the same as radiator 108 (e.g., a single radiator comprising both a primary or jacket cooling flow path and an after cooler flow path, as is well known in the art). Alternatively, the radiators 138 and 108 may be two separate radiators.

Figure 3:
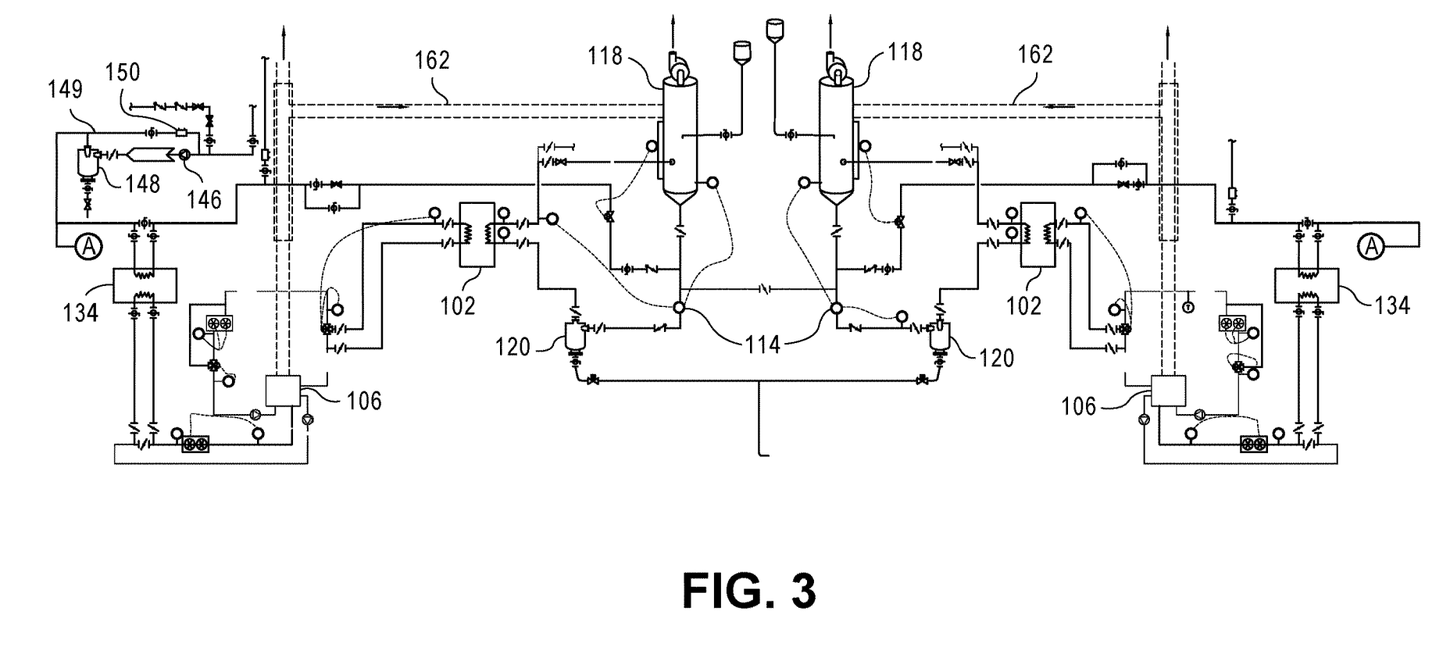
FIG. 3 shows a system for operating two evaporators using two prime movers, according to an embodiment of the present disclosure.

The process, or leachate side, of HX 134 receives leachate from the leachate storage system associated with the landfill from whence the leachate comes. An inlet system 143 for receiving the leachate from the landfill 145 comprises a pump 146, the HX 134 and a filtration system. In operation, pump 146 forces the incoming leachate through the filter system, which can comprise, for example, a centrifugal solids separator 148 and optional filter bank 150, to filter the incoming leachate. In an alternative embodiment, a continuous loop filtration process can be employed, as shown in FIG. 3, where the leachate is looped back around through conduit 149 to continuously run through centrifugal solids separator 149 and optionally a filter bank 150 to further clean the leachate.

Referring again to FIG. 1, after the initial filtration is completed, the leachate is pumped through the process fluid side of HX 134 where the heat exchange process with the aftercooler coolant pre-heats the leachate before it is introduced to the evaporator loop for removal by boiling. This allows removal of most of the particulate that causes foaming during boiling. It also benefits the LFGTE plant by cooling the aftercooler to improve efficiency as described elsewhere herein. City water can also optionally be added at this point for augmentation of cooling when no leachate is available or for wash down of the system, or for other reasons, as desired. FIG. 3 shows a similar system and process to that of FIG. 1, except that after filtration, the filtered leachate is supplied to two evaporator loops instead of one, each evaporator loop employing a separate heat exchanger 102 for transferring heat between a prime mover (e.g., such as a RICE 106 or turbine) and a flash tank 118. Any number of evaporators can be employed, depending, for example, on the number of prime movers available as a heat source.

As the process continues, the leachate in the closed loop will become an increasingly concentrated briny solution. At a certain point, the leachate in the loop will need to be inundated with fresh leachate to dilute it to an acceptable level again, or it must be rejected completely to the holding tank 124 for disposal with the rest of the rejected sediment and solids collected there. Then the loop can be refilled with fresh leachate and the process repeated as desired.

In an embodiment of the present disclosure, the centrifugal solids separator 120 installed in the evaporator loop 115 is part of an anti-foaming or de-foaming strategy. Chemicals, proteins and other contributors to foaming are contained in the leachate, the sediment, particulate and/or precipitate in, or are derived from, the leachate. Because the solids separator and filter remove most of these particles, they no longer contribute to foaming during the boiling process.

For stubborn foam produced during boiling that cannot be controlled by other means, a chemical injector is used to spray a fine mist of an anti-foaming agent or de-foaming agent on the top of the foam itself. This is accomplished by means of a metering system comprising a pump 154 and a chemical tank 156, illustrated in FIG. 1. Employing de-foaming agent to reduce foaming is generally well known in the art.

Figure 2:
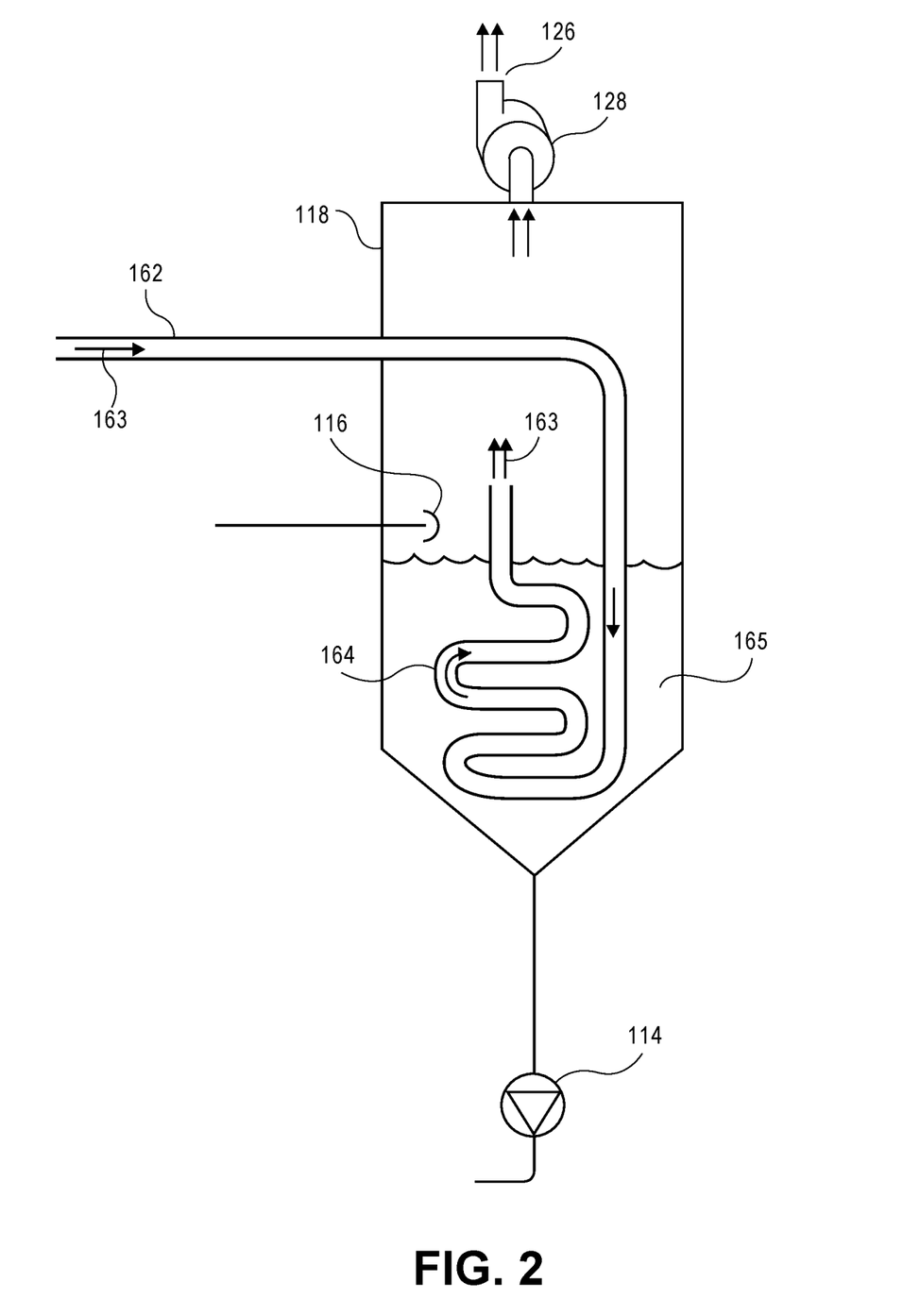
FIG. 2 shows a schematic side view of a flash tank, according to an embodiment of the present disclosure.

The prime mover (e.g., RICE 106) also offers waste heat carried away in the exhaust of the generator through an exhaust conduit 158. The heat from the exhaust is high grade heat (e.g., is generally above 250° F., such as 500° F. to 1500° F., or more, or such as any of the other temperature ranges described herein for high grade heat). In an embodiment, exhaust heat is captured in a heat exchange process utilizing any suitable gas-to-gas heat exchanger 160, such as, for example, a concentric heat exchanger 161 positioned around the exhaust conduit 158, as illustrated in FIG. 1. Generator exhaust gas flows on one side of HX 160 and ambient air 163 flows on the other. The ambient air 163 is heated to a high temperature in HX 160. The heated ambient air 163 is pulled through HX 160, through the interconnecting piping 162, through a set of HX tubes 164 immersed in the leachate in the flash tank (shown in FIG. 2), co-mingled with the steam in the flash tank 118, and then out through the suction side of exhaust blower 128 and thence out of the evaporator, as part of the process exhaust stream.

The blower 128 is positioned to pull air from the flash tank 118, as well as for pulling hot air through piping 162. As described above, this configuration provides for a reduced pressure in the flash tank 118, which can aid in maintaining the water in a steam phase. Further, introducing the hot ambient air 163 into the flash tank 118 can add thermal energy to the liquid leachate 165 as well as into the steam above the liquid leachate 165 in flash tank 118.

The hot ambient air 163 entering that flash tank 118 can be any suitable temperature that is appropriate for the process. The air temperature may vary depending on a number of factors, including the exhaust temperature from the prime mover, the efficiency of the heat exchanger 160, and other factors. Example temperatures ranges for the ambient air 163 entering the flash tank 118 include about 300° F. to about 900° F., such as about 350° F. to about 600° F., or about 400° F. to about 500° F. In an embodiment of the present disclosure, the energy added by the heated air increases the boil rate and therefore the capacity of the evaporator. It also increases the likelihood that the saturated steam produced in the flash steam process is heated to a level that results in conversion from saturation to 100% quality steam. This in turn increases the likelihood that little or no liquid component of the leachate escapes the process, resulting in only clean water vapor or substantially clean water vapor (e.g., greater than 99% water vapor by weight, such as about 99.5% water vapor to 100% water vapor, by weight) being exhausted from the flash tank exhaust stack 126 of the flash tank 118. Optionally, the steam exhausted from the flash tank 118 can be flowed to a condenser apparatus 190 (FIG. 1) to produce liquid water 192 as a product by condensing the steam. The liquid water can potentially be suitable for irrigation, industrial processing applications, drinking water or other applications. Condensers suitable for producing water from steam are well known and a suitable condenser could be selected by one of ordinary skill in the art. Alternatively, or in addition to the condenser apparatus 190, if the steam is used to further dehydrate waste material (e.g., rejected particulate and sediment gathered in the leachate evaporation process in holding tank 124) in a drying bed 195, as described herein, the energy exchange in the drying bed process could act as a condenser, causing the steam to condense back to water form where it could be collected and stored as "clean" water, even if not potable.

Figure 4:
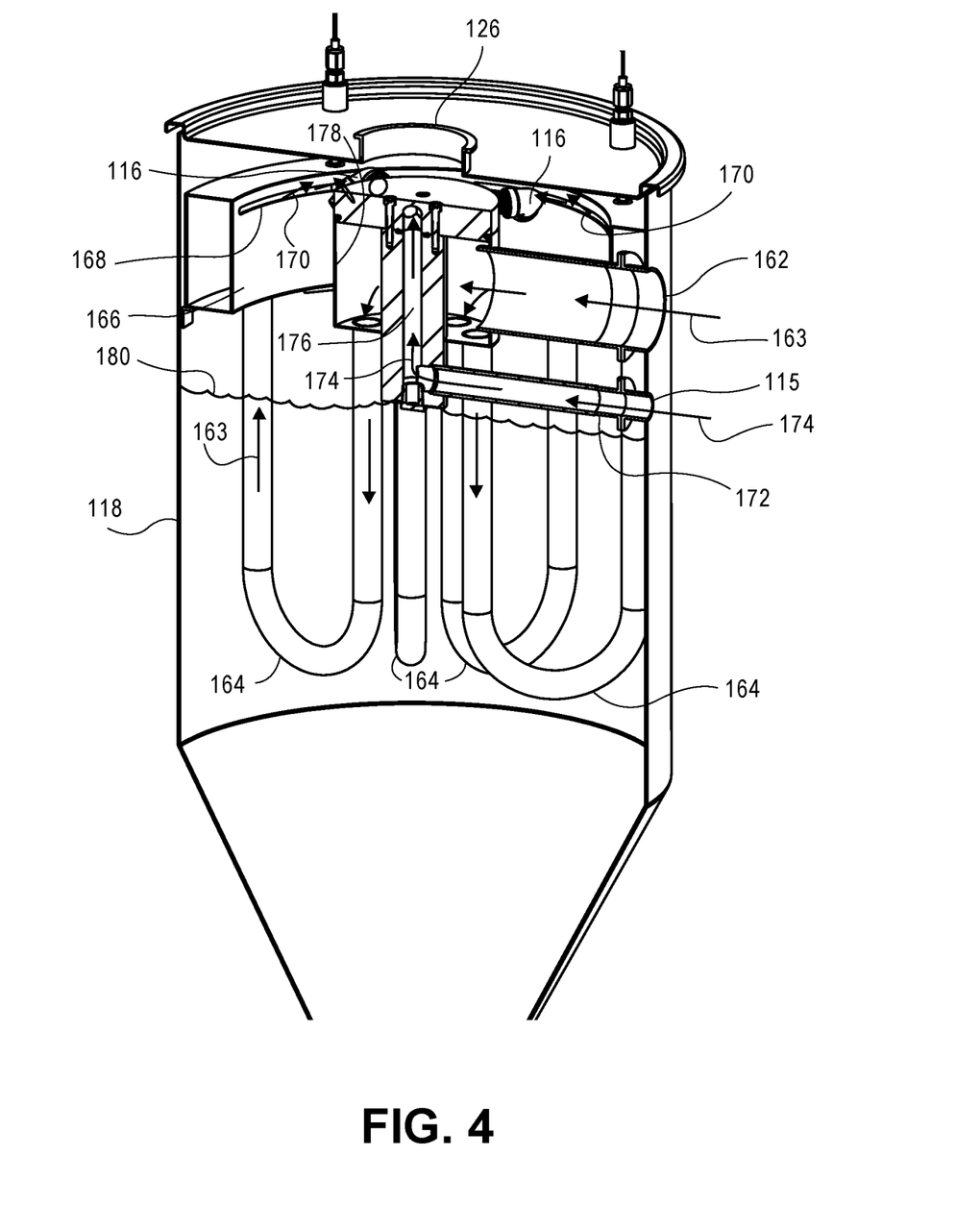
FIG. 4 illustrates a partial, cross-sectional view of a flash tank, according to an embodiment of the present disclosure.

In an embodiment, the hot ambient air 163 exiting the HX tubes 164, which are immersed in the boiling leachate in flash tank 118, is collected in a plenum 166 and then released through a slot 168 in the plenum 166 such that an air blade 170 is produced that cuts across the flash tank, as, for example, is shown in FIG. 4. Slot 168 can be a circumferential slot or other shaped slot. The high-energy air blade may reduce or eliminate any foam rising to the level of the air blade. While not intending to be limited by theory, the foam may be reduced or eliminated by virtue of the energy in the air converting the shell of the foam bubble to steam. This provides a manner of controlling foam in the flash tank and potentially also may aid in controlling the escape of liquid component of the leachate through the flash tank exhaust stack 126.

Figure 6:
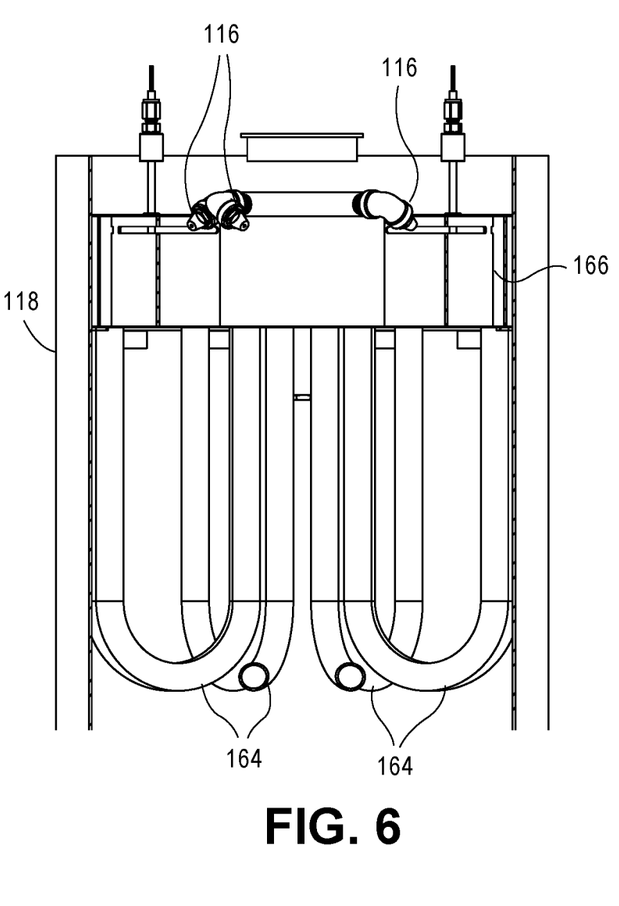
FIG. 6 illustrates a different cross-sectional view of the flash tank of FIG. 4, according to an embodiment of the present disclosure
Figure 7:
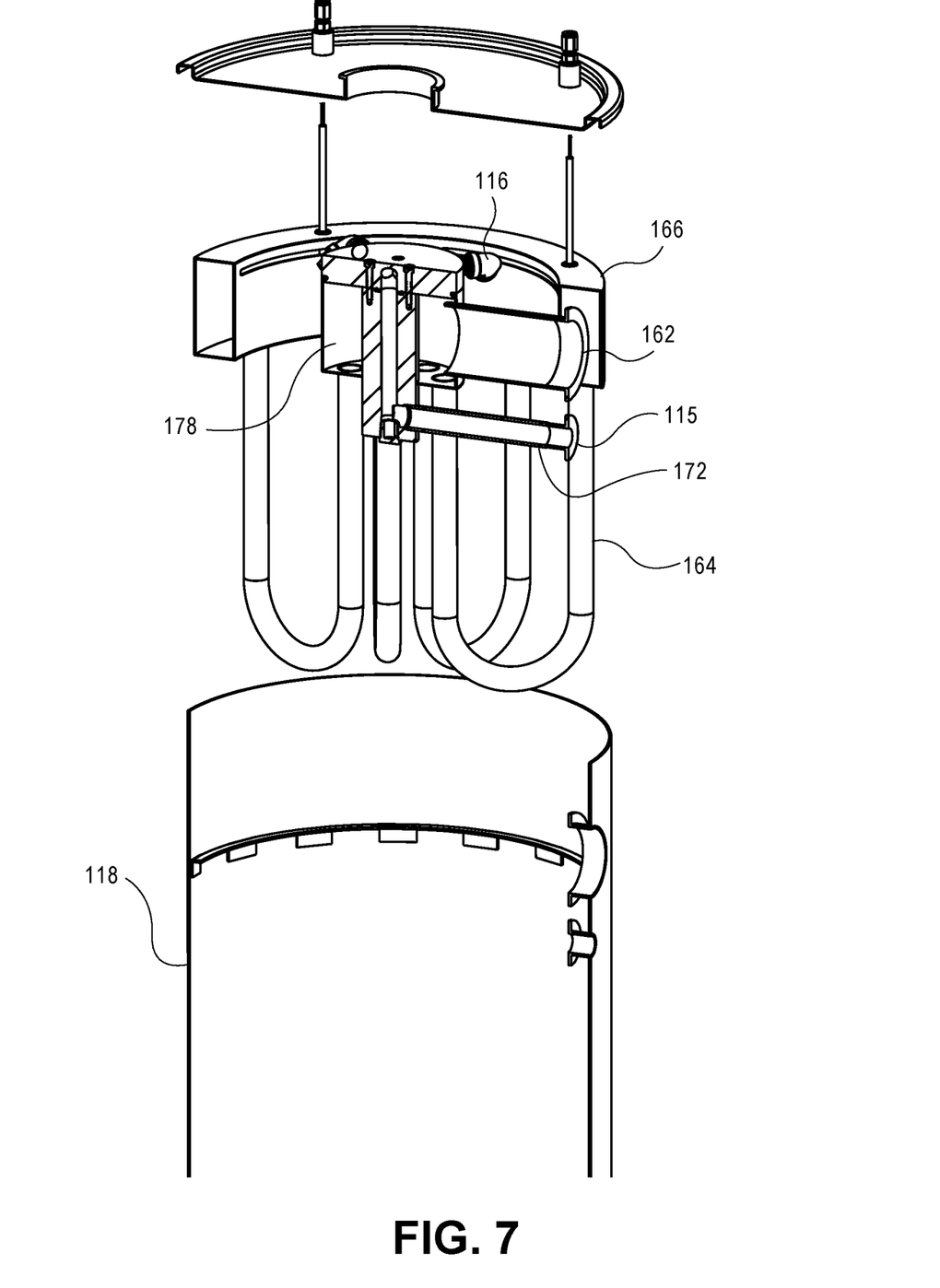

In the flash tank 118 of FIG. 4, leachate enters conduit 172, which is part of evaporator loop 115, and flows through a conduit 176 surrounded by a central plenum 178, as is shown by the arrows 174. The hot ambient air 163 flows through the central plenum 178 upon entering flash tank 118, thereby heating the conduit 176 and the leachate 174 flowing therein. An example level for liquid process fluid (e.g., leachate) during steady state operation of flash tank 118 is shown by the liquid surface line 180, although any other suitable liquid process fluid level could be employed. FIG. 5 shows a top view of flash tank 118 with the leachate 174 exiting the nozzles 116 as the water in the leachate 174 is vaporized in the reduced pressure of tank 118. FIG. 6 shows a different cross-sectional view of the flash tank 118, and FIG. 7 shows an exploded view of flash tank 118, with plenum 166, HX tubes 164 and central plenum 178.

In an alternative embodiment, a plenum is omitted from the flash tank 118 of FIG. 4. In this embodiment the hot air may flow through HX tubes 164 and directly into the flash tank 118 to mix with the steam vaporized from the leachate. In still another embodiment, the gas-to-gas HX 160 and associated hot ambient air loop are not employed as part of the system and method of FIG. 1. Instead, the system relies solely on heat provided by heat exchanger 102, and optionally heat exchanger 134, to provide the thermal energy for evaporation.

The system and process of FIG. 1 is described above as employing waste heat from a prime mover, such as RICE 106, in order to evaporate water from landfill leachate. However, the systems and methods of the present disclosure are not so limited and may be used for evaporating any liquid using any equipment that produces waste heat. Thus, the prime mover employed in the system of FIG. 1 is not limited to RICE 106, but can be any type of engine or turbine that can be used to drive an alternator in a power plant. Alternatively, the systems and methods of the present disclosure can employ any other type of prime mover, such as any engine or turbine employed in any other type of industrial process. For example, the prime mover can be an engine or turbine used to drive heavy machinery, pumps, air compressors or other gas compressors, and so forth. In yet another embodiment, the source of waste heat is not an engine or turbine, but can be from any heat producing equipment, such as fuel cells (such as fuel cells used in power plants for landfills or other applications), coal fired power plants, data centers or other sources of low and high grade waste heat. The waste heat from these sources can be supplied to a heat exchanger, such as HX 102 of FIG. 1, and thereby used to provide the thermal energy for an evaporation process. For purposes of this disclosure, low grade heat is 400° F. or less, such as about 200° F. to about 380° F., or about 210° F. to about 350° F., or about 220° F. to about 300° F., or about 220° F. to about 275° F., but above the temperature needed for evaporation of the liquid. For purposes of this application, high grade heat is above 400° F., such as about 450° F. to about 2000° F., or about 500° F. to about 1500° F.

Additionally, the systems and processes of the present disclosure are not limited to evaporating leachate from a landfill, but can be used to evaporate water or other liquids in any type of evaporative process, including evaporation of waste water, water-based effluent from chemical processes, water purification process (e.g., such as a desalination plant) or any other processes in which evaporation of water into the atmosphere or for water purification purposes may be desirable. Using systems of the present disclosure, waste heat could also be employed to drive evaporation of fluids other than water, such as alcohol or other fluids in a distillation plant. One of ordinary skill in the art, given the teachings of the present disclosure, would be able to employ waste heat from prime movers or other sources of waste heat, to drive such evaporation processes.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A method of evaporation, comprising:
   cooling a prime mover using a coolant, the cooling comprising pumping the coolant from the prime mover through a heat exchanger and back to the prime mover in a cooling circuit;
   circulating a process fluid in an evaporator loop comprising the heat exchanger and a flash tank, the process fluid being circulated from the flash tank, through the heat exchanger and to a flash nozzle positioned in the flash tank, the process fluid being a leachate from a landfill;
   reducing a pressure of the process fluid across the flash nozzle from a first pressure upstream of the flash nozzle to a second pressure in the flash tank, wherein heat from the coolant provides sufficient thermal energy to the process fluid in the heat exchanger so that a percentage of the process fluid changes phase from liquid to steam when the pressure of the process fluid is reduced across the flash nozzle; and
   ejecting steam from the flash tank to separate the steam from the process fluid.

2. The method of claim 1, wherein the prime mover is a reciprocating internal combustion engine.

3. The method of claim 1, wherein prior to circulating the process fluid through the heat exchanger, the process fluid is flowed through a centrifugal solids separator to separate solids from the leachate.

4. The method of claim 3, further comprising introducing makeup process fluid into the process fluid at a point between the flash tank and a pump used for the circulation of the process fluid, the makeup process fluid being leachate from the landfill.

5. The method of claim 4, wherein the makeup process fluid is preheated using heat supplied from an aftercooler cooling circuit of the prime mover.

6. The method of claim 1, wherein the prime mover comprises an exhaust conduit, the method further comprising heating ambient air using heat from the exhaust conduit of the prime mover and introducing the heated ambient air into the flash tank.

7. The method of claim 6, wherein the heated ambient air is flowed through a set of heat exchanger tubes immersed in the leachate in the flash tank, and then introduced into the steam in the flash tank.

8. The method of claim 7, wherein the heated ambient air is collected in a plenum in the flash tank, the heated ambient air being released through a circumferential slot in the plenum such that an air blade is produced above a surface of liquid leachate in the flash tank.

9. The method of claim 1, further wherein a waste material comprising solids from the leachate is produced by the method, the waste material having a reduced weight compared to a weight of a total amount of leachate used to produce the waste material.

10. The method of claim 1, wherein the ejecting steam from the flash tank comprises employing a blower to pull the steam from the flash tank.

11. The method of claim 1, wherein a sufficient amount of heat is rejected from the prime mover using the heat exchanger so that the prime mover is operated without employing a radiator.

12. The method of claim 1, wherein the prime mover is a turbine.

13. The method of claim 1, wherein the coolant being pumped from the prime mover to the heat exchanger has a temperature ranging from about 200° F. to about 300° F.

14. The method of claim 1, wherein the steam exhausted from the flash tank is condensed to produce liquid water.

15. The method of claim 1, wherein the process fluid comprises water.

16. The method of claim 1, wherein prior to circulating the process fluid through the heat exchanger, the process fluid is flowed through a filtration system.

17. The method of claim 1 wherein the coolant being pumped to the heat exchanger has a temperature ranging from about 200° F. to about 400° F.

* * * * *